United States Patent
Yu et al.

(10) Patent No.: US 9,029,446 B2
(45) Date of Patent: May 12, 2015

(54) CLARIFIED POLYPROPYLENE ARTICLES WITH IMPROVED OPTICAL PROPERTIES AND/OR INCREASED TEMPERATURE OF CRYSTALLIZATION

(75) Inventors: Jiong Yu, Congers, NY (US); Gerard R. Finnegan, Valley Cottage, NY (US); Ralph-Dieter Maier, White Plains, NY (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/956,557

(22) Filed: Nov. 30, 2010

(65) Prior Publication Data

US 2011/0136950 A1  Jun. 9, 2011

Related U.S. Application Data

(60) Provisional application No. 61/267,219, filed on Dec. 7, 2009.

(51) Int. Cl.
  *C08K 5/16* (2006.01)
  *C08L 23/12* (2006.01)
  *C08K 5/00* (2006.01)

(52) U.S. Cl.
  CPC ............... *C08L 23/12* (2013.01); *C08K 5/0041* (2013.01); *C08K 5/0083* (2013.01)

(58) Field of Classification Search
  USPC .......................... 524/88, 210, 228, 241, 242
  See application file for complete search history.

(56) References Cited

U.S. PATENT DOCUMENTS

| | | | | |
|---|---|---|---|---|
| 3,852,237 | A * | 12/1974 | Osborn et al. | 524/88 |
| 7,423,088 | B2 | 9/2008 | Mader et al. | |
| 2007/0149663 | A1* | 6/2007 | Schmidt et al. | 524/227 |
| 2007/0185247 | A1* | 8/2007 | Danielson et al. | 524/109 |
| 2009/0258560 | A1 | 10/2009 | Kristiansen et al. | |

FOREIGN PATENT DOCUMENTS

| | | |
|---|---|---|
| EP | 1909013 | * 4/2008 |
| JP | 58180543 | 10/1983 |
| JP | 2009209342 | 9/2009 |

OTHER PUBLICATIONS

Grimm and Weiser in "Transparent Coloration of Clarified Polypropylene for Packaging Applications", RETEC Conference: Back to Basics, Cincinnati, Ohio, Sep. 17-19, 2006, pp. 241-253, discusses transparent, colored polypropylene bottles.

* cited by examiner

*Primary Examiner* — Wenwen Cai
(74) *Attorney, Agent, or Firm* — Tyler A. Stevenson

(57) ABSTRACT

Disclosed are polypropylene articles with improved optical properties and/or an increased temperature of crystallization comprising a polypropylene resin and uniformly dispersed therein from about 1 ppm to about 10 ppm of one or more polycyclic organic pigments selected from blue, green, magenta, red, yellow, orange and violet polycyclic organic pigments and from about 50 ppm to about 250 ppm of one or more aromatic trisamide nucleating agents, where the ppm levels are by weight based on the weight of the polypropylene resin. The polypropylene is for example polypropylene homopolymer. The articles exhibit reduced haze, increased temperature of crystallization and excellent clarity.

10 Claims, No Drawings

CLARIFIED POLYPROPYLENE ARTICLES WITH IMPROVED OPTICAL PROPERTIES AND/OR INCREASED TEMPERATURE OF CRYSTALLIZATION

This application claims benefit of U.S. provisional app. No. 61/267,219, filed Dec. 7, 2009, the contents of which are incorporated by reference.

The present invention is aimed at polypropylene articles with reduced haze, increased temperature of crystallization and excellent clarity.

BACKGROUND

U.S. Pat. No. 7,423,088 and U.S. 200710149663 teach aromatic trisamide compounds as nucleating agents for thermoplastic polymers.

U.S. 2007/0185247 discloses polypropylene resin containing low loadings of carbon black together with dibenzylidene sorbitol based clarifying agents. The polypropylene articles are taught to have enhanced visual benefits.

MILLAD NX8000 is a commercial clarifying agent for polypropylene available from Milliken, Spartanburg, N.C. It has a bluish tint.

Grimm and Weiser in "Transparent Coloration of Clarified Polypropylene for Packaging Applications", RETEC Conference: Back to Basics, Cincinnati, Ohio, Sep. 17-19, 2006, pp. 241-253, discusses transparent, colored polypropylene bottles.

The U.S. patents and published applications listed herein are entirely incorporated by reference.

It has been found that polypropylene articles with superior optical properties and/or an increased temperature of crystallization may be prepared where they comprise trisamide nucleating agents together with low levels of polycyclic organic blue, green, magenta, red, yellow, orange or violet pigments.

SUMMARY

Disclosed is a polypropylene article with improved optical properties and/or an increased temperature of crystallization comprising a polypropylene resin and uniformly dispersed therein from about 1 ppm to about 10 ppm of one or more pigments selected from blue, green, magenta, red, yellow, orange and violet polycyclic organic pigments and from about 50 ppm to about 250 ppm of one or more aromatic trisamide nucleating agents, where the ppm levels are by weight based on the weight of the polypropylene resin.

Also disclosed is a method for providing a polypropylene article with improved optical properties and/or an increased temperature of crystallization, which method comprises uniformly dispersing into a polypropylene resin from about 1 ppm to about 10 ppm of one or more pigments selected from blue, green, magenta, red, yellow, orange and violet polycyclic organic pigments and from about 50 ppm to about 250 ppm of one or more aromatic trisamide nucleating agents, where the ppm levels are by weight based on the weight of the polypropylene resin.

DETAILED DISCLOSURE

The polypropylene resin is for instance a polypropylene homopolymer.

Polypropylene homopolymer also covers long chain branched polypropylene.

Polypropylene, can be prepared by different methods. Examples are:

Catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

According to a further embodiment of the present invention, the polypropylene resin is a polypropylene random copolymer, alternating or segmented copolymer or block copolymer containing one or more comonomers selected from the group consisting of ethylene, $C_4$-$C_{20}$-α-olefin, vinylcyclohexane, vinylcyclohexene, $C_4$-$C_{20}$alkandiene, $C_5$-$C_{12}$cycloalkandiene and norbornene derivatives; the total mole amount of propylene and the comonomer(s) being 100%.

Polypropylene copolymer also covers long chain branched polypropylene copolymer.

Examples of suitable $C_4$-$C_{20}$α-olefins are 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-eicosene and 4-methyl-1-pentene.

Examples of suitable $C_4$-$C_{20}$alkandienes are hexadiene and octadiene.

Examples of suitable $C_5$-$C_{12}$cycloalkandienes are cyclopentadiene, cyclohexadiene and cyclooctadiene.

Examples of suitable norbornene derivatives are 5-ethylidene-2-norbornene (ENB), dicyclopentadiene (DCP) and methylene-domethylene-hexahydronaphthaline (MEN).

A propylene/ethylene copolymer contains for example 50 to 99.9%, preferably 80 to 99.9%, in particular 90 to 99.9%, by weight of propylene.

A propylene copolymer wherein the comonomer is a $C_9$-$C_{20}$α-olefin such as e.g. 1-nonene, 1-decene, 1-undecene, 1-dodecene, 1-tetradecene, 1-hexadecene, 1-octadecene or 1-eicosene; $C_9$-$C_{20}$alkandiene, $C_9$-$C_{12}$cycloalkandiene or a norbornene derivative such as e.g. 5-ethylidene-2-norbornene (ENB) or methylene-domethylene-hexahydronaphthaline (MEN) contains preferably more than 90 mol %, in particular 90 to 99.9 mol % or 90 to 99 mol %, of propylene.

A propylene copolymer wherein the comonomer is a $C_4$-$C_8$α-olefin such as e.g. 1-butene, 1-pentene, 1-hexene, 1-heptene, 1-octene or 4-methyl-1-pentene; vinylcyclohexane, vinylcyclohexene, $C_4$-$C_8$alkandiene or $C_5$-$C_8$cycloalkandiene contains preferably more than 80 mol %, in particular 80 to 99.9 mol % or 80 to 99 mol %, of propylene.

Further examples of the polypropylene resin are propylene/isobutylene copolymer, propylene/butadiene copolymer, propylene/cycloolefin copolymer, terpolymers of propylene with ethylene and a diene such as hexadiene, dicyclopentadiene or ethylidene-norbornene; propylene/1-olefin copolymers where the 1-olefin is generated in situ; and propylene/carbon monoxide copolymers.

The polypropylenes of the present invention are in particular polypropylene homopolymers, polypropylene impact (heterophasic) copolymers, blends thereof and TPO's such as blends of polypropylene homopolymers and impact modifiers such as EPDM or ethylene/alpha-olefin copolymers.

TPO (thermoplastic olefin) is for example about 10 to about 90 parts propylene homopolymer, copolymer or terpolymer, and about 90 to about 10 parts (by weight) of an elastomeric copolymer of ethylene and a $C_3$-$C_8$ alpha-olefin. The elastomeric copolymer is for instance ethylene/propylene copolymer (EPM) or ethylene/propylene/non-conjugated diene (EPDM). TPO is disclosed for example in U.S. Pat. No. 6,048,942, incorporated by reference.

Polypropylene includes for instance reactor (such as metallocene) and visbroken (e.g. peroxides, hydroxylamine esters, thermally broken, etc.) grades.

The aromatic trisamide compounds are taught for example in U.S. Pat. No. 7,423,088 and U.S. 2007/0149663, the contents of which are hereby incorporated by reference.

The aromatic trisamides are for instance of formula I

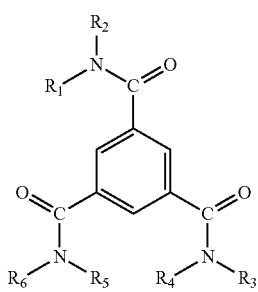

wherein
$R_1$, $R_2$, $R_3$, $R_4$, $R_5$ and $R_6$, independently of one another, are hydrogen,
$C_1$-$C_{20}$alkyl,
$C_2$-$C_{20}$alkyl substituted by $C_1$-$C_{10}$alkylamino, di($C_1$-$C_{10}$alkyl)amino, $C_1$-$C_{10}$alkyloxy or hydroxy;
$C_3$-$C_{20}$alkenyl,
$C_5$-$C_{12}$cycloalkyl,
$C_5$-$C_{12}$cycloalkyl substituted by 1, 2 or 3 $C_1$-$C_{10}$alkyl;
cyclohexylmethyl;
cyclohexylmethyl substituted by 1, 2 or 3 $C_1$-$C_{10}$alkyl;
$C_5$-$C_9$cycloalkenyl,
$C_5$-$C_9$cycloalkenyl substituted by 1, 2 or 3 $C_1$-$C_{10}$alkyl;
phenyl substituted by 1, 2 or 3 radicals selected from the group consisting of $C_1$-$C_{10}$alkyl, $C_1$-$C_{10}$alkyloxy, hydroxy, halogen, trihalogenmethyl, trihalogenmethoxy, benzoyl, phenylamino, acylamino and phenylazo;
$C_7$-$C_9$-phenylalkyl,
$C_7$-$C_9$-phenylalkyl which is substituted on the phenyl by 1, 2 or 3 radicals selected from the group consisting of $C_1$-$C_{10}$alkyl, $C_1$-$C_{10}$alkoxy and hydroxy;
naphthyl,
naphthyl substituted by $C_1$-$C_{10}$alkyl;
adamantyl, or
a 5 to 6 membered heterocyclic group.

Examples of $C_1$-$C_{20}$alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methyl-hexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methyl-undecyl, dodecyl, 1,1,3,3,5,5-hexamethylhexyl, tridecyl, tetradecyl, pentadecyl, hexadecyl, heptadecyl, octadecyl and eicosyl. Preferred examples are butyl, octyl and octadecyl.

Examples of $C_2$-$C_{20}$alkyl substituted by $C_1$-$C_{10}$alkylamino, di($C_1$-$C_{10}$alkyl)amino, $C_1$-$C_{10}$alkyloxy or hydroxy are 3-methylaminopropyl, 2-dimethylaminoethyl, 2-diethylaminoethyl, 3-dimethylaminopropyl, 3-diethylaminopropyl, 2-methoxyethyl, 2-ethoxyethyl, 2-methoxypropyl, 3-methoxypropyl, 2-ethoxypropyl, 3-isopropoxypropyl and hydroxyethyl. Preferred examples are 3-dimethylaminopropyl, 3-methoxypropyl and 2-methoxyethyl.

Examples of $C_3$-$C_{20}$alkenyl are allyl, 2-methallyl, butenyl, pentenyl, hexenyl and oleyl. The carbon atom in position 1 is preferably saturated. Preferred examples are allyl and oleyl.

Examples of $C_5$-$C_{12}$cycloalkyl are cyclopentyl, cyclohexyl, cycloheptyl, cyclooctyl and cyclododecyl. Preferred examples are cyclohexyl, cycloheptyl, cyclooctyl and cyclododecyl.

Preferred examples of $C_5$-$C_{12}$cycloalkyl substituted by 1, 2 or 3 $C_1$-$C_{10}$alkyl are 3-methylcyclohexyl and 2,3-dimethylcyclohexyl.

An example of cyclohexylmethyl substituted by 1, 2 or 3 $C_1$-$C_{10}$alkyl is 1-cyclohexylethyl.

An example of $C_5$-$C_9$cycloalkenyl is cyclohexenyl.

An example of $C_5$-$C_9$cycloalkenyl substituted by 1, 2 or 3 $C_1$-$C_{10}$alkyl is methylcyclohexenyl.

Examples of phenyl substituted by 1, 2 or 3 radicals selected from the group consisting of $C_1$-$C_{10}$alkyl, $C_1$-$C_{10}$alkyloxy, hydroxy, halogen, trihalogenmethyl, trihalogenmethoxy, benzoyl, phenylamino, acylamino and phenylazo are 4-methylphenyl, 2-ethylphenyl, 4-ethylphenyl, 4-isopropylphenyl, 4-tert-butylphenyl, 4-sec-butylphenyl, 4-isobutylphenyl, 3,5-dimethylphenyl, 3,4-dimethylphenyl, 2,4-dimethylphenyl, 2,6-diethylphenyl, 2-ethyl-6-methylphenyl, 2,6-diisopropylphenyl, 4-methoxyphenyl, 4-ethoxyphenyl, 4-hydroxyphenyl, 4-fluorophenyl, 3,5-difluorophenyl, 2-chlorophenyl, 3-chlorophenyl, 3-chloro-6-methylphenyl, 3,5-di(trifluoromethyl)phenyl, 4-trifluoromethoxyphenyl, 2-benzoylphenyl, 4-phenylaminophenyl, 4-acetamidophenyl and 4-(phenylazo)phenyl. A preferred example is 3,4-dimethylphenyl.

Examples of $C_7$-$C_9$phenylalkyl are benzyl and 2-phenylethyl. Benzyl is preferred.

Examples of $C_7$-$C_9$phenylalkyl which is substituted on the phenyl by 1, 2 or 3 radicals selected from the group consisting of $C_1$-$C_{10}$alkyl, $C_1$-$C_{10}$alkoxy and hydroxy are methylbenzyl, dimethylbenzyl, trimethylbenzyl, tert-butylbenzyl, methoxybenzyl and 3,5-di-tert-butyl-4-hydroxybenzyl.

An example of naphthyl substituted by $C_1$-$C_{10}$alkyl is methylnaphthyl.

Examples of a 5 to 6 membered heterocyclic group are 2-picolyl, (2-furyl)methyl, (2-tetrahydrofuryl)methyl, 2-pyrimidyl, 6-methyl-2-pyridyl, 1,2,4-triazol-3-yl and 2-(1-piperazinyl)ethyl.

The aromatic trisamides are for example of formulae IIa, IIb or IIc

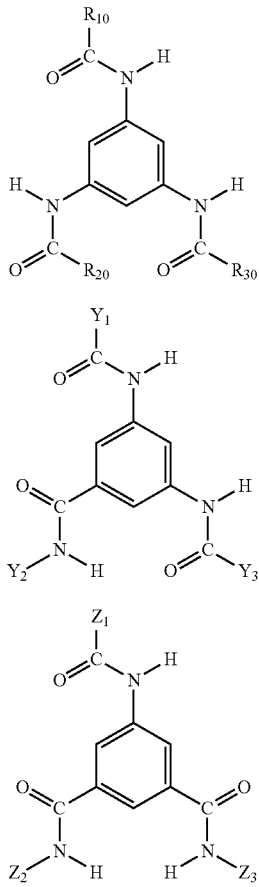

wherein
$R_{10}$, $R_{20}$ and $R_{30}$, or $Y_1$, $Y_2$ and $Y_3$, or $Z_1$, $Z_2$ and $Z_3$ independently of one another are
$C_1$-$C_{20}$alkyl unsubstituted or substituted by one or more hydroxy;
$C_2$-$C_{20}$alkenyl unsubstituted or substituted by one or more hydroxy;
$C_2$-$C_{20}$alkyl interrupted by oxygen or sulfur;
$C_3$-$C_{12}$cycloalkyl unsubstituted or substituted by one or more $C_1$-$C_{20}$alkyl;
($C_3$-$C_{12}$cycloalkyl)-$C_1$-$C_{10}$alkyl unsubstituted or substituted by one or more $C_1$-$C_{20}$alkyl;
bis[$C_3$-$C_{12}$cycloalkyl]-$C_1$-$C_{10}$alkyl unsubstituted or substituted by one or more $C_1$-$C_{20}$alkyl;
a bicyclic or tricyclic hydrocarbon radical with 5 to 20 carbon atoms unsubstituted or substituted by one or more $C_1$-$C_{20}$alkyl;
phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;
phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;
phenylethenyl unsubstituted or substituted by one or more $C_1$-$C_{20}$alkyl;
biphenyl-($C_1$-$C_{10}$alkyl) unsubstituted or substituted by one or more $C_1$-$C_{20}$alkyl;
naphthyl unsubstituted or substituted by one or more $C_1$-$C_{20}$alkyl;
naphthyl-$C_1$-$C_{20}$alkyl unsubstituted or substituted by one or more $C_1$-$C_{20}$alkyl;
naphthoxymethyl unsubstituted or substituted by one or more $C_1$-$C_{20}$alkyl; biphenylenyl, fluorenyl, anthryl;
a 5- to 6-membered heterocyclic radical unsubstituted or substituted by one or more $C_1$-$C_{20}$alkyl;
a $C_1$-$C_{20}$hydrocarbon radical containing one or more halogen; or
tri($C_1$-$C_{10}$alkyl)silyl($C_1$-$C_{10}$alkyl);
with the proviso that at least one of the radicals $R_{10}$, $R_{20}$ and $R_{30}$, or $Y_1$, $Y_2$ and $Y_3$, or $Z_1$, $Z_2$ and $Z_3$ is
branched $C_3$-$C_{20}$alkyl unsubstituted or substituted by one or more hydroxy;
$C_2$-$C_{20}$alkyl interrupted by oxygen or sulfur;
$C_3$-$C_{12}$cycloalkyl unsubstituted or substituted by one or more $C_1$-$C_{20}$alkyl;
($C_3$-$C_{12}$cycloalkyl)-$C_1$-$C_{10}$alkyl unsubstituted or substituted by one or more $C_1$-$C_{20}$alkyl;
a bicyclic or tricyclic hydrocarbon radical with 5 to 20 carbon atoms unsubstituted or substituted by one or more $C_1$-$C_{20}$alkyl;
phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;
phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;
biphenyl-($C_1$-$C_{10}$alkyl) unsubstituted or substituted by one or more $C_1$-$C_{20}$alkyl;
naphthyl-$C_1$-$C_{20}$alkyl unsubstituted or substituted by one or more $C_1$-$C_{20}$alkyl; or
tri($C_1$-$C_{10}$alkyl)silyl($C_1$-$C_{10}$alkyl).

According to a preferred embodiment, at least one of the radicals $R_{10}$, $R_{20}$ and $R_{30}$, or $Y_1$, $Y_2$ and $Y_3$, or $Z_1$, $Z_2$ and $Z_3$ is branched $C_3$-$C_{20}$alkyl, or $C_3$-$C_{12}$cycloalkyl unsubstituted or substituted by one or more $C_1$-$C_{20}$alkyl.

According to a particular preferred embodiment, at least one of the radicals $R_{10}$, $R_{20}$ and $R_{30}$, or $Y_1$, $Y_2$ and $Y_3$, or $Z_1$, $Z_2$ and $Z_3$ is branched $C_3$-$C_{10}$alkyl.

Examples of $C_1$-$C_{20}$alkyl, e.g. branched $C_3$-$C_{20}$alkyl, unsubstituted or substituted by one or more hydroxy, e.g. 1, 2 or 3 hydroxy, are ethyl, n-propyl, 1-methylethyl, n-butyl, 2-methylpropyl, 1-methylpropyl, tert-butyl, pentyl, 1-methylbutyl, 2-methylbutyl, 3-methylbutyl, 1,1-dimethylpropyl, 1-ethylpropyl, tert-butylmethyl, hexyl, 1-methylpentyl, heptyl, isoheptyl, 1-ethylhexyl, 2-ethylpentyl, 1-propylbutyl, octyl, nonyl, isononyl, neononyl, 2,4,4-trimethylpentyl, undecyl, tridecyl, pentadecyl, heptadecyl, hydroxymethyl and 1-hydroxyethyl. Branched $C_3$-$C_{10}$alkyl is particularly preferred. One of the preferred meanings of the radicals $R_{10}$, $R_{20}$ and $R_{30}$, or $Y_1$, $Y_2$ and $Y_3$, or $Z_1$, $Z_2$ and $Z_3$ is branched $C_3$-$C_{30}$alkyl with a quaternary C atom in position 1, in particular —C(CH$_3$)$_2$—H or —C(CH$_3$)$_2$—(C$_1$-C$_7$alkyl).

Examples of $C_2$-$C_{20}$alkenyl unsubstituted or substituted by one or more hydroxy, e.g. 1, 2 or 3 hydroxy, are 9-decenyl, 8-heptadecenyl and 11-hydroxy-8-heptadecenyl.

Examples of $C_2$-$C_{20}$alkyl interrupted by oxygen are t-butoxymethyl, t-butoxyethyl, t-butoxypropyl and t-butoxybutyl.

Examples of $C_2$-$C_{20}$alkyl interrupted by sulfur are (H$_3$C)$_3$C—S—CH$_2$—, (H$_3$C)$_3$C—S—C$_2$H$_4$—, (H$_3$C)$_3$C—S—C$_3$H$_6$— and (H$_3$C)$_3$C—S—C$_4$H$_8$—.

Examples of $C_3$-$C_{12}$cycloalkyl unsubstituted or substituted by one or more $C_1$-$C_{20}$alkyl, e.g. 1, 2, 3 or 4 $C_1$-$C_4$alkyl, are cyclopropyl, 3-methylcyclopropyl, 2,2,3,3-tetramethylcyclopropyl, cyclobutyl, cyclopentyl, cyclohexyl, 1-methylcyclohexyl, 2-methylcyclohexyl, 3-methylcyclohexyl, 4-methylcyclohexyl, 4-tert-butylcyclohexyl and cycloheptyl.

Examples of ($C_3$-$C_{12}$cycloalkyl)-$C_1$-$C_{10}$alkyl unsubstituted or substituted by one or more $C_1$-$C_{20}$alkyl, e.g. 1, 2 or 3 $C_1$-$C_4$alkyl, are cyclopentylmethyl, 2-cyclopentylethyl, cyclohexylmethyl, 2-cyclohexylethyl, 3-cyclohexylpropyl, 4-cyclohexylbutyl and (4-methylcyclohexpmethyl.

An example of bis[$C_3$-$C_{12}$cycloalkyl]-$C_1$-$C_{10}$alkyl unsubstituted or substituted by one or more $C_1$-$C_{20}$alkyl, e.g. 1, 2 or 3 $C_1$-$C_4$alkyl, is dicyclohexylmethyl.

Examples of a bicyclic or tricyclic hydrocarbon radical with 5 to 20 carbon atoms unsubstituted or substituted by one or more $C_1$-$C_{20}$alkyl, e.g. 1, 2 or 3 $C_1$-$C_4$alkyl, are

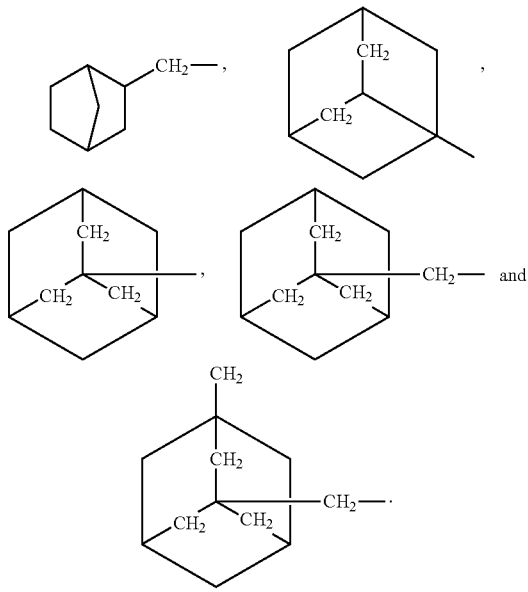

Examples of phenyl unsubstituted or substituted by one or more radicals, e.g. 1, 2 or 3 radicals, selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro, preferably $C_1$-$C_4$alkyl, $C_1$-$C_4$alkoxy, $C_1$-$C_4$alkylamino, di($C_1$-$C_4$alkyl)amino, hydroxy and nitro, are phenyl, 3-methylphenyl, 3-methoxyphenyl, 4-methylphenyl, 4-ethylphenyl, 4-propylphenyl, 4-isopropylphenyl, 4-Cert-butylphenyl, 4-isopropoxyphenyl, 2,3-dimethoxyphenyl, 2-nitrophenyl, 3-methyl-6-nitrophenyl, 4-dimethylaminophenyl, 2,3-dimethylphenyl, 2,6-dimethylphenyl, 2,4-dimethylphenyl, 3,4-dimethylphenyl, 3,5-dimethylphenyl, 3,5-di-tert-butylphenyl, 2,4,6-trimethylphenyl and 3,5-di-tert-butyl-4-hydroxyphenyl.

Examples of phenyl-$C_1$-$C_{20}$alkyl unsubstituted or substituted by one or more radicals, e.g. 1, 2 or 3 radicals, selected from $C_1$-$C_{20}$alkyl, $C_3$-$C_{12}$cycloalkyl, phenyl, $C_1$-$C_{20}$alkoxy and hydroxy, preferably $C_1$-$C_4$alkyl, $C_3$-$C_6$cycloalkyl, phenyl, $C_1$-$C_4$alkoxy and hydroxy, are benzyl, α-cyclohexylbenzyl, diphenylmethyl, 1-phenylethyl, α-hydroxybenzyl, 2-phenylethyl, 2-phenylpropyl, 3-phenylpropyl, 3-methylbenzyl, 3,4-dimethoxybenzyl and 2-(3,4-dimethoxyphenyl)ethyl.

An example of phenylethenyl unsubstituted or substituted by one or more $C_1$-$C_{20}$alkyl, e.g. 1, 2 or 3 $C_1$-$C_4$alkyl, is 2-(4-methylphenyl)ethenyl.

An example of biphenyl-($C_1$-$C_{10}$alkyl) unsubstituted or substituted by one or more $C_1$-$C_{20}$alkyl, e.g. 1, 2 or 3 $C_1$-$C_4$alkyl, is 4-biphenylmethyl.

Examples of naphthyl unsubstituted or substituted by one or more $C_1$-$C_{20}$alkyl, e.g. 1, 2 or 3 $C_1$-$C_4$alkyl, are 1-naphthyl and 2-naphthyl.

Examples of naphthyl-$C_1$-$C_{20}$alkyl unsubstituted or substituted by one or more $C_1$-$C_{20}$alkyl, e.g. 1, 2 or 3 $C_1$-$C_4$alkyl, are 1-naphthylmethyl and 2-naphthylmethyl.

An example of naphthoxymethyl unsubstituted or substituted by one or more $C_1$-$C_{20}$alkyl, e.g. 1, 2 or 3 $C_1$-$C_4$alkyl, is 1-naphthoxymethyl.

An example of biphenylenyl, fluorenyl or anthryl is 2-biphenylenyl, 9-fluorenyl, 1-fluorenyl or 9-anthryl, respectively.

Examples of a 5- to 6-membered heterocyclic radical unsubstituted or substituted by one or more $C_1$-$C_{20}$alkyl, e.g. 1, 2 or 3 $C_1$-$C_4$alkyl, are 3-pyridinyl, 4-pyridinyl, 2-hydroxypyridin-3-yl, 3-quinolinyl, 4-quinolinyl, 2-furyl, 3-furyl and 1-methyl-2-pyrryl.

Examples of a $C_1$-$C_{20}$hydrocarbon radical containing one or more halogen, e.g. 1, 2, 3, 4, 5, or 6 —F, —Cl or —I, are 1-bromo-2-methylpropyl, dichloromethyl, pentafluoroethyl, 3,5-bisitrifluoromethyliphenyl, 2,3,5,6-tetrafluoro-p-tolyl, 2,3-dichlorophenyl, 3,4-dichlorophenyl and 2,4-bis[trifluoromethyl]phenyl.

Examples of compounds of formula (IIa) are:
1,3,5-tris[cyclohexylcarbonylamino]benzene,
1,3,5-tris[2,2-dimethylpropionylamino]benzene,
1,3,5-tris[4-methylbenzoylamino]benzene,
1,3,5-tris[3,4-dimethylbenzoylamino]benzene,
1,3,5-tris[3,5-dimethylbenzoylamino]benzene,
1,3,5-tris[cyclopentanecarbonylamino]benzene,
1,3,5-tris[1-adamantanecarbonylamino]benzene,
1,3,5-tris[2-methylpropionylamino]benzene,
1,3,5-tris[3,3-dimethylbutyrylamino]benzene,
1,3,5-tris[2-ethylbutyrylamino]benzene,
1,3,5-tris[2,2-dimethylbutyrylamino]benzene,
1,3,5-tris[2-cyclohexyl-acetylamino]benzene,
1,3,5-tris[3-cyclohexyl-propionylamino]benzene,
1,3,5-tris[4-cyclohexyl-butyrylamino]benzene,
1,3,5-tris[5-cyclohexyl-valeroylamino]benzene,
1-isobutyrylamino-3,5-bis[pivaloylamino]benzene,
2,2-dimethylbutyrylamino-3,5-bis[pivaloylamino]benzene,
3,3-dimethylbutyrylamino-3,5-bis[pivaloylamino]benzene,
1,3-bis[isobutyrylamino]-5-pivaloylaminobenzene,
1,3-bis[isobutyrylamino]-5-(2,2-dimethyl-butyryl)aminobenzene,
1,3-bis[isobutyrylamino]-5-(3,3-dimethyl-butyryl)aminobenzene,
1,3-bis[2,2-dimethylbutyrylamino]-5-pivaloylaminobenzene,
1,3-bis[2,2-dimethylbutyrylamino]-5-isobutyrylaminobenzene,
1,3-bis[2,2-dimethylbutyrylamino]-5-(3,3-dimethylbutyryl)-aminobenzene,
1,3-bis[3,3-dimethylbutyrylamino]-5-pivaloylamino-benzene,
1,3-bis[3,3-dimethylbutyrylamino]-5-isobutyryl-aminobenzene,
1,3-bis[3,3-dimethylbutyrylamino]-5-(2,2-dimethyl-butyrylamino)aminobenzene, and
1,3,5-tris[3-(trimethylsilyppropionylamino]benzene.

Further examples of compounds of formula (IIa) are:
1,3,5-tris[2,2-dimethylvaleroylamino]benzene,
1,3,5-tris[3,3-dimethylvaleroylamino]benzene,
1,3,5-tris[2,4-dimethylvaleroylamino]benzene, 1,3,5-tris[4,4-dimethylvaleroylamino]benzene,
1,3,5-tris[4-methylvaleroylamino]benzene,
1,3,5-tris[2-methylbutyrylamino]benzene,
1,3,5-tris[2-methylvaleroylamino]benzene,
1,3,5-tris[3-methylvaleroylamino]benzene,
1,3,5-tris[2,2,3,3-tetramethyl-cyclopropanecarbonylamino]benzene,
1,3,5-tris[cyclopentylacetylamino]benzene,
1,3,5-tris[3-cyclopentylpropionylamino]benzene,
1,3,5-tris[2-norbornyl-acetylamino]benzene,
1,3,5-tris[4-t-butylcyclohexane-1-carbonylamino]benzene,
1,3,5-tris[2-(t-butoxy)-acetylamino]benzene,
1,3,5-tris[3-(t-butoxy)-propionylamino]benzene,
1,3,5-tris[4-(t-butoxy)-butyrylamino]benzene,
1,3,5-tris[5-t-butoxy-valeroylamino]benzene,
1,3,5-tris[cyclopropanecarbonylamino]benzene,
1,3,5-tris[2-methylcyclopropane-1-carbonylamino]benzene,
1,3,5-tris[3-noradamantane-1-carbonylamino]benzene,
1,3,5-tris[biphenyl-4-acetylamino]benzene,
1,3,5-tris[2-naphthyl-acetylamino]benzene,
1,3,5-tris[3-methylphenyl-acetylamino]benzene,
1,3,5-tris[(3,4-dimethoxyphenyl)-acetylamino]benzene,
1,3,5-tris[(3-trinnethylsilyi-propionylamino]benzene, and
1,3,5-tris[(4-trimethylsilyl-butyrylamino]benzene.

Examples of compounds of formula (IIb) are:
N-t-butyl-3,5-bis-(3-methylbutyrylamino)-benzamide,
N-t-butyl-3,5-bis-(pivaloylamino)-benzamide,
N-t-octyl-3,5-bis-(pivaloylamino)-benzamide,
N-(1,1-dimethyl-propyl)-3,5-bis-(pivaloylamino)-benzamide,
N-(t-octyl)-3,5-bis-(isobutyrylamino)-benzamide,
N-(t-butyl)-3,5-bis-(pivaloylamino)-benzamide,
N-(2,3-dimethyl-cyclohexyl)-3,5-bis-(pivaloylamino)-benzamide,
N-t-butyl-3,5-bis-(cyclopentanecarbonylamino)-benzamide,
N-(3-methylbutyl)-3,5-bis-(3-methylbutyrylamino)-benzamide,
N-(3-methylbutyl)-3,5-bis-(pivaloylamino)-benzamide,
N-(3-methylbutyl)-3,5-bis-(4-methylpentanoylamino)-benzamide,
N-(3-methylbutyl)-3,5-bis-(cyclopentanecarbonylamino)-benzamide,
N-(3-methylbutyl)-3,5-bis-(cyclohexanecarbonylamino)-benzamide,
N-cyclopentyl-3,5-bis-(3-methylbutyrylamino)-benzamide,
N-cyclopentyl-3,5-bis-(pivaloylamino)-benzamide,
N-cyclopentyl-3,5-bis-(4-methylpentanoylamino)-benzamide,
N-cyclopentyl-3,5-bis-(cyclopentanecarbonylamino)-benzamide,
N-cyclopentyl-3,5-bis-(cyclohexanecarbonylamino)-benzamide,
N-cyclohexyl-3,5-bis-(3-methylbutyrylamino)-benzamide,
N-cyclohexyl-3,5-bis-(pivaloylamino)-benzamide,
N-cyclohexyl-3,5-bis-(4-methylpentanoylamino)-benzamide,
N-cyclohexyl-3,5-bis-(cyclopentanecarbonylamino)-benzamide,
N-cyclohexyl-3,5-bis-(cyclohexanecarbonylamino)-benzamide,
N-isopropyl-3,5-bis-(pivaloylamino)-benzamide,
N-isopropyl-3,5-bis-(isobutyrylannino)-benzamide,
N-t-butyl-3,5-bis-(2,2-dimethylbutyrylamino)-benzamide, and
N-t-octyl-3,5-bis-(2,2-dimethylbutyrylamino)-benzamide.

Examples of compounds of formula (IIc) are:
5-pivaloylamino-isophthalic acid N,N'-di-t-butyldiamide,
5-pivaloylamino-isophthalic acid N,N'-di-t-octyldiamide,
5-(2,2-dimethylbutyrylamino)-isophthalic acid N,N'-di-t-butyldiamide,
5-(2,2-dimethylbutyrylamino)-isophthalic acid N,N'-di-t-octyldiamide,
5-(3-methylbutyrylamino)-isophthalic acid N,N'-di-cyclohexyldiamide,
5-(pivaloyfamino)-isophthalic acid N,N'-di-cyclohexyldiamide,
5-(cyclopentanecarbonylamino)-isophthalic acid N,N'-dicyclohexyldiamide,
5-(cyclohexylcarbonylamino)-isophthalic acid N,N'-di-cyclohexyldiamide,
5-(cyclopentanecarbonylamino)-isophthalic acid N,N'-bis-(2-methylcyclohexyl)diamide,
5-(cyclohexanecarbonylamino)-isophthalic acid N,N'-bis-(2-methylcyclohexyl)diamide,
5-((1-methylcyclohexanecarbonyl)amino)-isophthalic acid N,N'-bis-(2-methylcyclohexyl)diamide, and
5-((2-methylcyclohexanecarbonyl)amino)-isophthalic acid N,N'-bis-(2-methylcyclohexyl)diamide.

The present pigments are polycyclic organic pigments and are selected from the group consisting of blue, green, magenta, red, yellow, orange and violet polycyclic organic pigments. The blue pigments are for example of the indanthrone and the copper phthalocyanine classes, for instance Pigment Blue 60, Pigment Blue 15:1, Pigment Blue 15:3, Pigment Blue 15:4 and Pigment Blue 15:6. The green pigments are for example of the copper phthalocyanine class, for instance Pigment Green 7 and Pigment Green 36. The magenta pigments are for instance of the quinacridone class, for example 2,9-dichloro quinacridone, Pigment Red 202. The red pigments are for instance of the quinacridone class, for instance dimethyl quinacridone, Pigment Red 122, or of the perylene class, for instance Pigment Red 149, Pigment Red 178 and Pigment Red 179, or of the diketopyrrolopyrrole class, for instance Pigment Red 254 and Pigment Red 264. The yellow pigments are for instance of the pteridine, isoindolinone, and isoindoline classes, for example Pigment Yellow 215, Pigment Yellow 110, and Pigment Yellow 139. The orange pigments are of the isoindolinone or diketopyrrolopyrrole class, for instance Pigment Orange 61, Pigment Orange 71, and Pigment Orange 73. The violet pigments are for instance of the quinacridone class, for instance pigment violet 19 or of the dioxazine class, for instance pigment violet 23 or pigment violet 37. Advantageously, mixtures of pigments may be employed.

In the processes and compositions of the present invention the above described aromatic trisamide compounds are present in concentrations, based on the amount of the polypropylene resin, of from about 50 ppm to about 250 ppm by weight. For instance, the trisamides are present from about 100 ppm to about 200 ppm by weight. For instance, the trisamides are present at about 50, 100, 150, 200 or 250 ppm by weight and ranges in between. The aromatic trisamides can be added as individual compounds or as mixtures to the polypropylene.

In the processes and compositions of the present invention, the above pigments are present in concentrations of from about 1 ppm to about 10 ppm by weight, based on the weight of the polypropylene resin. For instance, the pigments are present at weight levels of about 1, 2, 3, 4, 5, 6, 7, 8, 9 or about 10 ppm, based on the weight of the polypropylene resin. In the processes and compositions of the present invention, the above pigments are preferably present in concentrations of from about 2 ppm or about 4 ppm to about 10 ppm by weight, based on the weight of polypropylene resin.

The pigments are for example a mixture of one or more blue pigments and one or more magenta, red or violet pigments.

Further additives may be present in the polypropylene resin of the invention. For instance, ultraviolet light absorbers selected from hydroxyphenylbenzotriazole, hydroxyphenyltriazine, benzophenone and benzoate UV absorbers, organic phosphorus stabilizers, hydroxylamine stabilizers, benzofuranone stabilizers, amine oxide stabilizers, hindered phenol antioxidants and/or hindered amine light stabilizers. The further additives are for instance employed at levels of about 0.1 to about 10% by weight, based on the weight of the polypropylene resin.

In particular, further additives are selected from the organic phosphorus stabilizers, hindered phenol antioxidants, hydroxylamines, hindered amines and benzoate UV absorbers.

The organic phosphorus stabilizers are for example known phosphite and phosphonite stabilizers and include triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite (F), tris(2,4-di-tert-butylphenyl)phosphite, bis(2,4-di-α-cumylphenyl)pentaerythrtitol diphosphite (K), diisodecyl pentaerythritol diphosphite, bis(2,4-di-tert-butylphenyl)pentaerythritol diphosphite (D), bis(2,6-di-tert-butyl-4-methylphenyl)pentaerythritol diphosphite (E), bisisodecyloxypentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphite, tetrakis (2,4-di-tert-butylphenyl) 4,4'-biphenylene-diphosphonite (H), 6-isooctyloxy-2,4,8,10-tetra-tert-butyl-dibenzo[d,f][1,3,2]dioxaphosphepin (C), 6-fluoro-2,4,8,10-tetra-tert-butyl-12-methyl-dibenzo[d,g][1,3,2] dioxaphosphocin (A), bis(2,4-di-tert-butyl-6-methylphenyl) methyl phosphite, bis(2,4-di-tert-butyl-6-methylphenyl) ethyl phosphite (G), 2,2',2"-nitrilo[triethyltris(3,3'5,5'-tetra-tert-butyl-1,1'-biphenyl-2,2'-diyl)phosphite] (B), bis(2,4-di-t-butylphenyl)octylphosphite, poly(4,4'- {2,2'-dimethyl-5,5'-di-t-butylphenylsulfide- }octylphosphite), poly(4,4'{-isopropylidenediphenol}-octylphosphite), poly(4,4'-{isopropylidenebis[2,6-dibromophenol]}-octylphosphite), poly(4,4'- {2,2'-dimethyl-5,5'-di-t-butylphenylsulfide}-pentaerythrityl diphosphite), 3,3-dimethylol-heptane 2,4,6-tri-tert-butylphenyl phosphite (J), 2,2'-methylene bis(4,6-di-tert-butylphenyl)octyl phosphite (L)

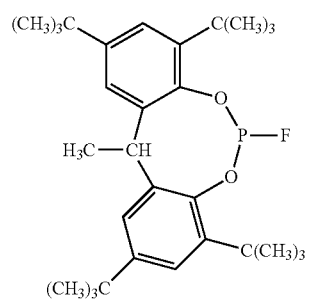

(A)

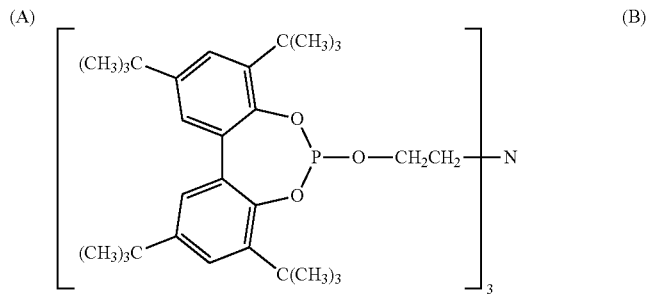

(B)

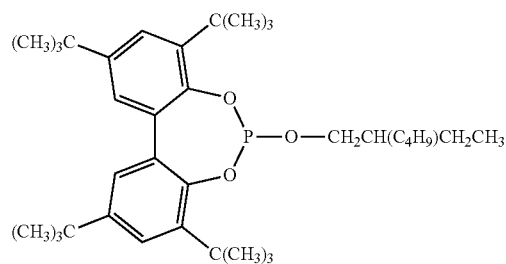

(C)

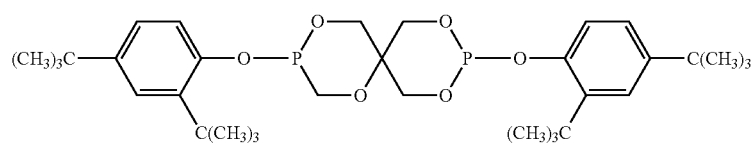

(D)

-continued

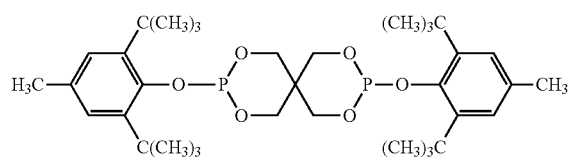
(E)

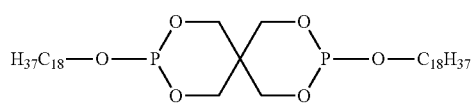
(F)

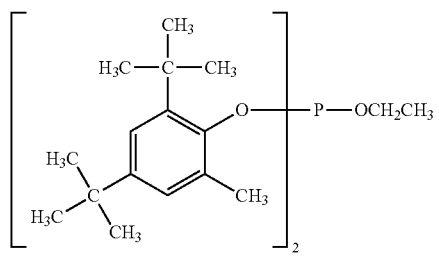
(G)

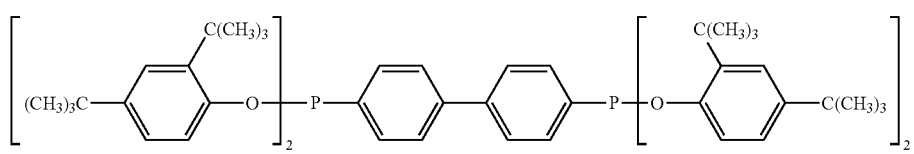
(H)

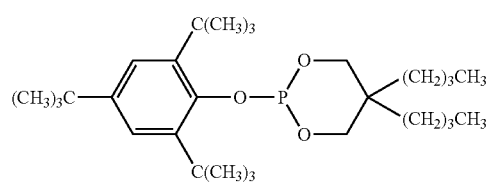
(J)

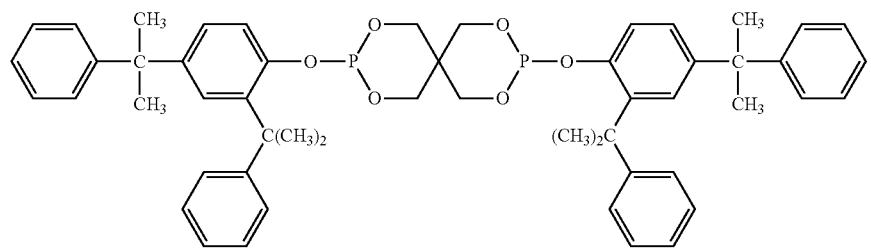
(K)

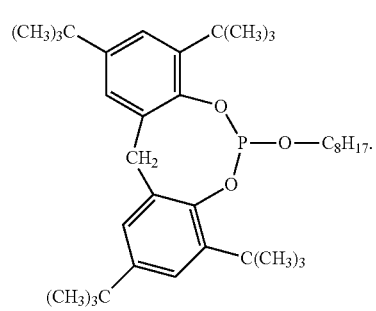
(L)

Hindered phenolic antioxidants include for example tris(3,5-di-tert-butyl-4-hydroxybenzyl)isocyanurate, 1,3,5-tris-(3,5-di-tert-butyl-4-hydroxybenzyl)-2,4,6-trimethylbenzene, the calcium salt of the monoethyl ester of 3,5-di-tert-butyl-4-hydroxybenzylphosphonic acid, pentaerythritol tetrakis [3-(3,5-di-tert-butyl-4-hydroxyphenyl)propionate] or octadecyl 3-(3,5-di-tert-butyl-4-hydroxyphenyl)propionate.

The present sterically hindered amine stabilizers contain at least one moiety of formula

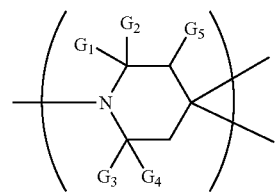

where $G_1$, $G_2$, $G_3$ and $G_4$ are independently alkyl of 1 to 8 carbon atoms or $G_1$ and $G_2$ or $G_3$ and $G_4$ together are pentamethylene and $G_5$ is hydrogen or alkyl of 1 to 8 carbon atoms.

The hindered amines are disclosed for example in U.S. Pat. Nos. 5,004,770, 5,204,473, 5,096,950, 5,300,544, 5,112,890, 5,124,378, 5,145,893, 5,216,156, 5,844,026, 5,980,783, 6,046,304, 6,117,995, 6,271,377, 6,297,299, 6,392,041, 6,376,584, 6,472,456, and 7,030,196. The relevant disclosures of these patents are hereby incorporated by reference.

U.S. Pat. Nos. 6,271,377, 6,392,041 and 6,376,584, cited above disclose hindered hydroxyalkoxyamine stabilizers.

Suitable hindered amines include for example:
1) 1-cyclohexyloxy-2,2,6,6-tetramethyl-4-octadecylaminopiperidine,
2) bis(2,2,6,6-tetramethylpiperidin-4-yl)sebacate,
3) bis(1-acetoxy-2,2,6,6-tetramethylpiperidin-4-yl)sebacate,
4) bis(1,2,2,6,6-pentamethyl-4-yl)sebacate,
5) bis(1-cyclohexyloxy-2,2,6,6-tetramethylpiperidin-4-yl)sebacate,
6) bis(1-octyloxy-2,2,6,6-tetramethylpiperidin-4-yl)sebacate;
7) bis(1-acyl-2,2,6,6-tetramethylpiperidin-4-yl)sebacate,
8) bis(1,2,2,6,6-pentamethyl-4-piperidyl)n-butyl-3,5-di-tert-butyl-4-hydroxybenzylmalonate
9) 2,4-bis[(1-cyclohexyloxy-2,2,6,6-tetramethylpiperidin-4-yl)butylamino]-6-(2-hydroxy-ethylamino-s-triazine,
10) bis(1-cyclohexyloxy-2,2,6,6-tetramethylpiperidin-4-yl)adipate,
11) 2,4-bis[(1-cyclohexyloxy-2,2,6,6-piperidin-4-yl)butylamino]-6-chloro-s-triazine,
12) 1-(2-hydroxy-2-methylpropoxy)-4-hydroxy-2,2,6,6-tetramethylpiperidine,
13) 1-(2-hydroxy-2-methylpropoxy)-4-oxo-2,2,6,6-tetramethylpiperidine,
14) 1-(2-hydroxy-2-methylpropoxy)-4-octadecanoyloxy-2,2,6,6-tetramethylpiperidine,
15) bis(1-(2-hydroxy-2-methylpropoxy)-2,2,6,6-tetramethylpiperidin-4-yl)sebacate,
16) bis(1-(2-hydroxy-2-methylpropoxy)-2,2,6,6-tetramethylpiperidin-4-yl)adipate,
17) 2,4-bis{N-[1-(2-hydroxy-2-methylpropoxy)-2,2,6,6-tetramethylpiperidin-4-yl]-N-butyl-amino}-6-(2-hydroxy-ethylamino)-s-triazine,
18) 4-benzoyl-2,2,6,6-tetramethylpiperidine,
19) di-(1,2,2,6,6-pentamethylpiperidin-4-yl)p-methoxybenzylidenemalonate,
20) 4-stearyloxy-2,2,6,6-tetramethylpiperidine,
21) bis(1-octyloxy-2,2,6,6-tetramethylpiperidyl)succinate,
22) 1,2,2,6,6-pentamethyl-4-aminopiperidine,
23) 2-undecyl-7,7,9,9-tetramethyl-1-oxa-3,8-diaza-4-oxospiro[4,5]decane,
24) tris(2,2,6,6-tetramethyl-4-piperidyl)nitrilotriacetate,
25) tris(2-hydroxy-3-(amino-(2,2,6,6-tetramethylpiperidin-4-yl)propyl)nitrilotriacetate,
26) tetrakis(2,2,6,6-tetramethyl-4-piperidyl)-1,2,3,4-butane-tetracarboxylate,
27) tetrakis(1,2,2,6,6-pentamethyl-4-piperidyl)-1,2,3,4-butane-tetracarboxylate,
28) 1,1'-(1,2-ethanediyl)-bis(3,3,5,5-tetramethylpiperazinone),
29) 3-n-octyl-7,7,9,9-tetramethyl-1,3,8-triazaspiro[4.5]decan-2,4-dione,
30) 8-acetyl-3-dodecyl-7,7,9,9-tetramethyl-1,3,8-triazaspiro[4.5]decane-2,4-dione,
31) 3-dodecyl-1-(2,2,6,6-tetramethyl-4-piperidyl)pyrrolidin-2,5-dione,
32) 3-dodecyl-1-(1,2,2,6,6-pentamethyl-4-piperidyl)pyrrolidine-2,5-dione,
33) N,N'-bis-formyl-N,N'-bis(2,2,6,6-tetramethyl-4-piperidyl)hexamethylenediamine,
34) the reaction product of 2,4-bis[(1-cyclohexyloxy-2,2,6,6-piperidin-4-yl)butylamino]-6-chloro-s-triazine with N,N'-bis(3-aminopropyl)ethylenediamine),
35) the condensate of 1-(2-hydroxyethyl)-2,2,6,6-tetramethyl-4-hydroxypiperidine and succinic acid,
36) linear or cyclic condensates of N,N'-bis(2,2,6,6-tetramethyl-4-piperidyl)-hexamethylenediamine and 4-tert-octylamino-2,6-dichloro-1,3,5-triazine,
37) linear or cyclic condensates of N,N'-bis(2,2,6,6-tetramethyl-4-piperidyl)-hexamethylenediamine and 4-cyclohexylamino-2,6-dichloro-1,3,5-triazine,
38) linear or cyclic condensates of N,N-bis-(2,2,6,6-tetramethyl-4-piperidyl)-hexamethylenediamine and 4-morpholino-2,6-dichloro-1,3,5-triazine,
39) linear or cyclic condensates of N,N'-bis-(1,2,2,6,6-pentamethyl-4-piperidyl)-hexamethylenediamine and 4-morpholino-2,6-dichloro-1,3,5-triazine,
40) the condensate of 2-chloro-4,6-bis(4-n-butylamino-2,2,6,6-tetramethylpiperidyl)-1,3,5-triazine and 1,2-bis(3-aminopropylamino)ethane,
41) the condensate of 2-chloro-4,6-di-(4-n-butylamino-1,2,2,6,6-pentamethylpiperidyl)-1,3,5-triazine and 1,2-bis-(3-aminopropylamino)ethane,
42) a reaction product of 7,7,9,9-tetramethyl-2-cycloundecyl-1-oxa-3,8-diaza-4-oxospiro[4,5]decane and epichlorohydrin,
43) poly[methyl,(3-oxy-(2,2,6,6-tetramethylpiperidin-4-yl)propyl)]siloxane, CAS#182635-99-0,
44) reaction product of maleic acid anhydride-$C_{18}$-$C_{22}$-$\alpha$-olefin-copolymer with 2,2,6,6-tetramethyl-4-aminopiperidine,
45) the oligomeric compound which is the condensation product of 4,4'-hexamethylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine,
46) the oligomeric compound which is the condensation product of 4,4'-hexamethylene-bis(amino-1,2,2,6,6-pentaannethylpiperidine) and 2,4-dichloro-6-[(1,2,2,6,6-pentaamethyl-piperidin-4-yl)butylamino]-s-triazine end-capped with 2-chloro-4,6-bis(dibutylamino)-s-triazine,
47) the oligomeric compound which is the condensation product of 4,4'-hexamethylene-bis(amino-1-propoxy-2,2,6,6-tetramethylpiperidine) and 2,4-dichloro-6-[(1-propoxy-2,2,6,6-tetra-methylpiperidin-4-yl)butylamino]-s-triazine end-capped with 2-chloro-4,6-bis(dibutylamino)-s-triazine,
48) the oligomeric compound which is the condensation product of 4,4'-hexamethylene-bis(amino-1-acyloxy-2,2,6,6-tetramethylpiperidine) and 2,4-dichloro-6-[(1-acyloxy-2,2,6,6-tetra-methylpiperidin-4-yl)butylamino]-s-triazine end-capped with 2-chloro-4,6-bis(dibutylamino)-s-triazine and
49) product obtained by reacting a product, obtained by reacting 1,2-bis(3-amino-propylamino)ethane with cyanuric chloride, with (2,2,6,6-tetramethylpiperidin-4-yl)butylamine.

Also included are the sterically hindered N—H, N-methyl, N-methoxy, N-propoxy, N-octyloxy, N-cyclohexyloxy, N-(2-hydroxy-2-methylpropoxy) and N-acyl analogues of any of the above mentioned compounds. For example, replacing an N—H hindered amine with an N-methyl hindered amine would be employing the N-methyl analogue in place of the N—H.

Hydroxylamine stabilizers are for example N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine or N,N-di(hydrogenated tallow) hydroxylamine.

The amine oxide stabilizer is for example GENOX EP, a di($C_{16}$-$C_{18}$)alkyl methyl amine oxide, CAS#204933-93-7.

Benzofuranone stabilizers are for example 3-(4-(2-acetoxyethoxy)phenyl)-5,7-di-tert-butyl-benzofuran-2-one, 5,7-di-tert-butyl-3-(4-(2-stearoyloxyethoxy)phenyl)benzofuran-2-one, 3,3'-bis(5,7-di-tert-butyl-3-(4-(2-hydroxyethoxy)phenyl)benzofuran-2-one), 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one or 3-(2,3-dimethylphenyl)-5,7-di-tert-butyl-benzofuran-2-one.

Benzoate UV absorbers are for instance esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Hydroxyphenylbenzotriazole, hydroxyphenyltriazine and benzophenone UV absorbers are well known and are disclosed for instance in U.S. Pat. No. 6,444,733, incorporated by reference.

The addition of the aromatic trisamides, the pigments and further additives to the polypropylene resin can be carried out in all customary mixing machines in which the polymer is melted and mixed with the additives.

Suitable machines are known to those skilled in the art. They are predominantly mixers, kneaders and extruders.

The process is preferably carried out in an extruder by introducing the additives during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion, Vol.* 1 *Grundlagen*, Editors F. Hensen, W. Knappe, H. Potente, 1989, pp. 3-7, ISBN:3-446-14339-4 (*Vol.* 2 *Extrusionsanlagen* 1986, ISBN 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components are added, these can be premixed or added individually.

The polypropylene resins need to be subjected to an elevated temperature for a sufficient period of time during incorporation of additives. The temperature is generally above the softening point of the polymers.

In a preferred embodiment of the processes of the present invention, a temperature range lower than 280° C., particularly from about 160° C. to 280° C. is employed. In a particularly preferred process variant, the temperature range from about 200° C. to 270° C. is employed.

Such "melt mixing" or "melt compounding" results in uniform dispersion of the present additives in the polypropylene.

Incorporation of additives into the polypropylene resin can be carried out, for example, by mixing the above-described aromatic trisamides or mixtures thereof and pigments and, if desired, further additives into the polymers using the methods customary in process technology.

The aromatic trisamides, pigments and further additives can also be added to the polypropylene resin in the form of a masterbatch in which these compounds are present, for example, in a concentration of from about 0.5 to about 30% by weight in a thermoplastic polymer. The present invention therefore further provides a concentrate in which the additives of the invention are present in a concentration of from about 0.5 to about 30% by weight in a thermoplastic polymer and which can be added to the polypropylene resin. The thermoplastic polymer may be polypropylene or another thermoplastic resin.

The additized polypropylene resin is normally collected as pellets, which may be stored for a time or employed immediately in a forming process.

To achieve additized polypropylene pellets with the desired levels of additives, one or more letdown steps may be included.

The forming processes include injection molding, extrusion blow molding, injection stretch blow molding, thermoforming, compression molding or sheet extrusion.

The final formed articles are for instance molded parts, sheets, films or fibers. For example bottles, containers, automotive parts, refrigerator parts, trays, computer parts and the like.

The present polypropylene articles have superior optical properties and/or an increased temperature of crystallization. They exhibit reduced haze and high clarity and/or an increased temperature of crystallization. Optical properties are measured by light transmission, clarity, haze and degree of yellowness. Light transmission, clarity and haze are measured according to ASTM D1003. Yellowness Index (YI) is measured in a similar fashion to ASTM E313, illuminant $C_2$° observer, reflectance with specular light included. The present articles exhibit for example a haze value of less than 8.0 according to ASTM D1003.

The present articles are essentially clear and exhibit high transmission of visible light.

The following Examples further illustrate the invention. All percentages are in weight percent unless otherwise indicated.

EXAMPLE 1

Polypropylene Homopolymer

Polypropylene homopolymer with a melt index of 12.0 g/10 min. is compounded with the additives with a twin screw W&P ZSK 25 extruder under a nitrogen blanket at 220° C. Each formulation contains 400 ppm IRGANOX 1010 phenolic antioxidant, 800 ppm IRGAPHOS 168 phosphite process stabilizer, 500 ppm calcium stearate and 180 ppm present nucleating agent TA1. Additive levels are weight percent based on the weight of the polypropylene. The compounded polypropylene is collected as pellets. The pellets are subjected to injection molding with a Boy 50 M, step mold, die temperature of 230° C. Plaques are prepared, 2" by 2", 25 mil, 40 mil and 50 mil thick. The plaques are stored for 3 days at room temperature prior to any testing.

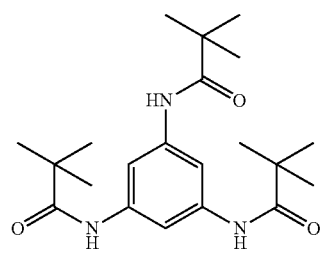

TA1

To the formulation of the present invention is also added 4 ppm of CROMOPHTAL Blue BCN and 1 ppm of CROMOPHTAL Magenta P pigments. CROMOPHTAL Blue BCN is pigment blue 15:1. CROMOPHTAL Magenta P is pigment red 202.

Light transmission, clarity and haze are measured according to ASTM D1003 on 40 mil plaques. YI is measured on 50 mil plaques.

The present formulation has a temperature of crystallization, $T_c$, of 126° C. The formuation without pigment has a $T_c$ of 122° C. Temperature of crystallization is measured by differential scanning calorimetry on a 5 mg sample removed from the center of a 25 mil plaque.

The present formulation exhibits improved visual apperance, YI of −1.69. The formulation without pigment exhibits a YI of 4.50. YI is measured on a Datacolor SF600 spectrophotometer using C illuminant and 2° observer.

The transmission (T), haze (H) and clarity (C) on 40 mil plaques are as follows:

|  | T | H | C |
|---|---|---|---|
| Present formuation | 85.64 | 10.57 | 99.50 |
| Formulation without Pigment | 88.30 | 13.34 | 99.46 |

The transmission (T), haze (H) and clarity (C) on 50 mil plaques are as follows:

|  | T | H | C |
|---|---|---|---|
| Present formuation | 83.46 | 18.94 | 99.52 |
| Formulation without pigment | 87.02 | 22.80 | 99.48 |

EXAMPLE 2

Polypropylene Random Copolymer

Polypropylene random copolymer with a melt index of 12.0 g/10 min. is compounded with the additives with a twin screw W&P ZSK 25 extruder under a nitrogen blanket at 220° C. Each formulation contains 400 ppm IRGANOX 1010 phenolic antioxidant, 800 ppm IRGAPHOS 168 phosphite process stabilizer, 500 ppm calcium stearate and 150 ppm present nucleating agent TA1. Additive levels are weight percent based on the weight of the polypropylene. The compounded polypropylene is collected as pellets.

To the formulation of the present invention are also added CROMOPHTAL Blue BCN and CROMOPHTAL Magenta P pigments at levels specified below. CROMOPHTAL Blue BCN is pigment blue 15:1. CROMOPHTAL Magenta P is pigment red 202.

| Formulation | Pigment blue 15:1 [ppm] | Pigment red 202 [ppm] | Tc [° C.] |
|---|---|---|---|
| a | 2 | 0.5 | 111.5 |
| b | 4 | 1 | 112.1 |
| c | 8 | 2 | 112.7 |
| comparative | — | — | 109.7 |

Present formulations a-c have elevated temperatures of crystallization, $T_c$, as compared to the formulation without pigment. Temperature of crystallization is measured by differential scanning calorimetry, cooling from the melt at a rate of 20° C./min on a 5 mg sample cut from a pellet.

Increased temperature of crystallization is commercially important because it translates into faster cooling time resulting in reduced cycle time in molding processes.

What is claimed is:

1. A polypropylene article with improved optical properties and/or an increased temperature of crystallization comprising a polypropylene resin and uniformly dispersed therein from about 1 ppm to about 10 ppm of one or more pigments selected from blue, green, magenta, red, yellow, orange and violet polycyclic organic pigments, and from about 50 ppm to about 250 ppm of one or more aromatic trisamide nucleating agents, wherein if the pigments comprise copper phthalocycanine or quinacridone pigments, each is from about 1 ppm to about 4 ppm, wherein the ppm levels are by weight based on the weight of the polypropylene resin, and wherein the aromatic trisamide nucleating agents are of formula (IIa)

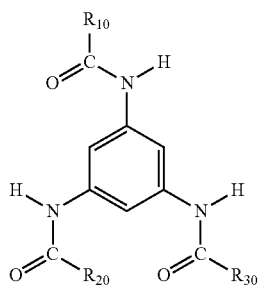

(IIa)

wherein $R_{10}$, $R_{20}$ and $R_{30}$ independently of one another are $C_1$-$C_{20}$alkyl unsubstituted or substituted by one or more hydroxy;

$C_2$-$C_{20}$alkenyl unsubstituted or substituted by one or more hydroxy;

$C_2$-$C_{20}$alkyl interrupted by oxygen or sulfur;
$C_3$-$C_{12}$cycloalkyl unsubstituted or substituted by one or more $C_1$-$C_{20}$alkyl;
($C_3$-$C_{12}$cycloalkyl)-($C_1$-$C_{10}$alkyl) unsubstituted or substituted by one or more $C_1$-$C_{20}$alkyl;
bis[$C_3$-$C_{12}$cycloalkyl]-($C_1$-$C_{10}$alkyl) unsubstituted or substituted by one or more $C_1$-$C_{20}$alkyl;
a bicyclic or tricyclic hydrocarbon radical with 5 to 20 carbon atoms unsubstituted or substituted by one or more $C_1$-$C_{20}$alkyl;
phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;
phenyl-($C_1$-$C_{10}$alkyl) unsubstituted or substituted by one or more radicals selected from $C_1$-$C_{20}$alkyl, $C_3$-$C_{12}$cycloalkyl, phenyl, $C_1$-$C_{20}$alkoxy and hydroxy;
phenylethenyl unsubstituted or substituted by one or more $C_1$-$C_{20}$alkyl;
biphenyl-($C_1$-$C_{10}$alkyl) unsubstituted or substituted by one or more $C_1$-$C_{20}$alkyl;
naphthyl unsubstituted or substituted by one or more $C_1$-$C_{20}$alkyl;
naphthyl-($C_1$-$C_{10}$alkyl) unsubstituted or substituted by one or more $C_1$-$C_{20}$alkyl;
naphthoxymethyl unsubstituted or substituted by one or more $C_1$-$C_{20}$alkyl;
biphenylenyl; fluorenyl; anthryl;
a 5- to 6-membered heterocyclic radical unsubstituted or substituted by one or more $C_1$-$C_{20}$alkyl;
a $C_1$-$C_{20}$hydrocarbon radical containing one or more halogen; or
tri($C_1$-$C_{10}$alkyl)silyl($C_1$-$C_{10}$alkyl);
with the proviso that at least one of $R_{10}$, $R_{20}$ and $R_{30}$ is
branched $C_3$-$C_{20}$alkyl unsubstituted or substituted by one or more hydroxy;
$C_2$-$C_{20}$alkyl interrupted by oxygen or sulfur;
$C_3$-$C_{12}$cycloalkyl unsubstituted or substituted by one or more $C_1$-$C_{20}$alkyl;
($C_3$-$C_{12}$cycloalkyl)-($C_1$-$C_{10}$alkyl) unsubstituted or substituted by one or more $C_1$-$C_{20}$alkyl;
a bicyclic or tricyclic hydrocarbon radical with 5 to 20 carbon atoms unsubstituted or substituted by one or more $C_1$-$C_{20}$alkyl;
phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;
phenyl-($C_1$-$C_{10}$alkyl) unsubstituted or substituted by one or more radicals selected from $C_1$-$C_{20}$alkyl, $C_3$-$C_{12}$cycloalkyl, phenyl, $C_1$-$C_{20}$alkoxy and hydroxy;
biphenyl-($C_1$-$C_{10}$alkyl) unsubstituted or substituted by one or more $C_1$-$C_{20}$alkyl;
naphthyl-$C_1$-$C_{10}$alkyl) unsubstituted or substituted by one or more $C_1$-$C_{20}$alkyl; or
tri($C_1$-$C_{10}$alkyl)silyl($C_1$-$C_{10}$alkyl).

2. The polypropylene article according to claim 1 wherein the polypropylene resin is polypropylene homopolymer.

3. The polypropylene article according to claim 1 wherein in the trisamide nucleating agents
at least one of $R_{10}$, $R_{20}$ and $R_{30}$ is branched $C_3$-$C_{20}$alkyl unsubstituted or substituted by one or more hydroxy, or is $C_3$-$C_{12}$cycloalkyl unsubstituted or substituted by one or more $C_1$-$C_{20}$alkyl.

4. The polypropylene article according to claim 1 comprising the one or more trisamide nucleating agents selected from
1,3,5-tris[cyclohexylcarbonylamino]benzene,
1,3,5-tris[2,2-dimethylpropionylamino]benzene,
1,3,5-tris[4-methylbenzoylamino]benzene,
1,3,5-tris[3,4-dimethylbenzoylamino]benzene,
1,3,5-tris[3,5-dimethylbenzoylamino]benzene,
1,3,5-tris[cyclopentanecarbonylamino]benzene,
1,3,5-tris[1-adamantanecarbonylamino]benzene,
1,3,5-tris[2-methylpropionylamino]benzene,
1,3,5-tris[3,3-dimethylbutyrylamino]benzene,
1,3,5-tris[2-ethylbutyrylamino]benzene,
1,3,5-tris[2,2-dimethylbutyrylamino]benzene,
1,3,5-tris[2-cyclohexyl-acetylamino]benzene,
1,3,5-tris[3-cyclohexyl-propionylamino]benzene,
1,3,5-tris[4-cyclohexyl-butyrylamino]benzene,
1,3,5-tris[5-cyclohexyl-valeroylamino]benzene,
1-isobutyrylamino-3,5-bis[pivaloylamino]benzene,
2,2-dimethylbutyrylamino-3,5-bis[pivaloylamino]benzene,
3,3-dimethylbutyrylamino-3,5-bis[pivaloylamino]benzene,
1,3-bis[isobutyrylamino]-5-pivaloylaminobenzene,
1,3-bis[isobutyrylamino]-5-(2,2-dimethyl-butyryl)aminobenzene,
1,3-bis[isobutyrylamino]-5-(3,3-dimethyl-butyryl)aminobenzene,
1,3-bis[2,2-dimethylbutyrylamino]-5-pivaloylaminobenzene,
1,3-bis[2,2-dimethylbutyrylamino]-5-isobutyrylaminobenzene,
1,3-bis[2,2-dimethylbutyrylamino]-5-(3,3-dimethylbutyry)-aminobenzene,
1,3-bis[3,3-dimethylbutyrylamino]-5-pivaloylamino-benzene,
1,3-bis[3,3-dimethylbutyrylamino]-5-isobutyryl-aminobenzene,
1,3-bis[3,3-dimethylbutyrylamino]-5-(2,2-dimethyl-butyrylamino)aminobenzene, and
1,3,5-tris[3-(trimethylsilyl)propionylamino]benzene.

5. The polypropylene article according to claim 1 comprising from about 100 ppm to about 200 ppm by weight of the trisamide nucleating agents.

6. The polypropylene article according to claim 1 where the polycyclic organic pigments are selected from copper phthalocyanine, indanthrone, quinacridone, perylene, dioxazine, pteridine, isoindolinone, isoindoline and diketopyrrolopyrrole pigments.

7. The polypropylene article according to claim 1 where the polycyclic organic pigments are selected from pigment blue 60, pigment blue 15:1, pigment blue 15:3, pigment blue 15:4, pigment blue 15:6, pigment red 202, pigment red 122, pigment red 149, pigment red 178, pigment red 179, pigment violet 19, pigment violet 23 and pigment violet 37.

8. The polypropylene article according to claim 1 comprising a mixture of one or more of the blue pigments and one or more of the magenta, the red or the violet pigments.

9. The polypropylene article according to claim 1 further comprising one or more additives selected from hydroxyphenylbenzotriazole, hydroxyphenyltriazine, benzophenone or benzoate UV absorbers, organic phosphorus stabilizers, hydroxylamine stabilizers, benzofuranone stabilizers, amine oxide stabilizers, hindered phenol antioxidants and hindered amine light stabilizers.

10. A method for providing a polypropylene article with improved optical properties and/or an increased temperature of crystallization, comprises uniformly dispersing into a polypropylene resin from about 1 ppm to about 10 ppm of one or more pigments selected from blue, green, magenta, red, yellow, orange and violet polycyclic organic pigments, and
from about 50 ppm to about 250 ppm of one or more aromatic trisamide nucleating agents,
wherein if the pigments comprise copper phthalocyanine or quinacridone pigments, each is from about 1 ppm to about 4 ppm,
wherein the ppm levels are by weight based on the weight of the polypropylene resin, and
wherein the aromatic trisamide nucleating agents are of formula (IIa)

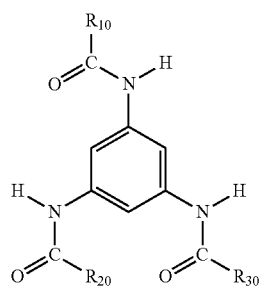

(IIa)

wherein
$R_{10}$, $R_{20}$ and $R_{30}$ independently of one another are
$C_1$-$C_{20}$alkyl unsubstituted or substituted by one or more hydroxy;
$C_2$-$C_{20}$alkenyl unsubstituted or substituted by one or more hydroxy;
$C_2$-$C_{20}$alkyl interrupted by oxygen or sulfur;
$C_3$-$C_{12}$cycloalkyl unsubstituted or substituted by one or more $C_1$-$C_{20}$alkyl;
($C_3$-$C_{12}$cycloalkyl)-($C_1$-$C_{10}$alkyl) unsubstituted or substituted by one or more $C_1$-$C_{20}$alkyl;
bis[$C_3$-$C_{12}$cycloalky]-($C_1$-$C_{10}$alkyl) unsubstituted or substituted by one or more $C_1$-$C_{20}$alkyl;
a bicyclic or tricyclic hydrocarbon radical with 5 to 20 carbon atoms unsubstituted or substituted by one or more $C_1$-$C_{20}$alkyl;
phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;
phenyl-($C_1$-$C_{10}$alkyl) unsubstituted or substituted by one or more radicals selected from $C_1$-$C_{20}$alkyl, $C_3$-$C_{12}$cycloalkyl, phenyl, $C_1$-$C_{20}$alkoxy and hydroxy;
phenylethenyl unsubstituted or substituted by one or more $C_1$-$C_{20}$alkyl;
biphenyl-($C_1$-$C_{10}$alkyl) unsubstituted or substituted by one or more $C_1$-$C_{20}$alkyl;
naphthyl unsubstituted or substituted by one or more $C_1$-$C_{20}$alkyl;
naphthyl-($C_1$-$C_{10}$alkyl) unsubstituted or substituted by one or more $C_1$-$C_{20}$alkyl;
naphthoxymethyl unsubstituted or substituted by one or more $C_1$-$C_{20}$alkyl;
biphenylenyl; fluorenyl; anthryl;
a 5- to 6-membered heterocyclic radical unsubstituted or substituted by one or more $C_1$-$C_{20}$alkyl;
a $C_1$-$C_{20}$hydrocarbon radical containing one or more halogen; or
tri($C_1$-$C_{10}$alkyl)silyl($C_1$-$C_{10}$alkyl);
with the proviso that at least one of $R_{10}$, $R_{20}$ and $R_{30}$ is
branched $C_3$-$C_{20}$alkyl unsubstituted or substituted by one or more hydroxy;
$C_2$-$C_{20}$alkyl interrupted by oxygen or sulfur;
$C_3$-$C_{12}$cycloalkyl unsubstituted or substituted by one or more $C_1$-$C_{20}$alkyl;
($C_3$-$C_{12}$cycloalkyl)-($C_1$-$C_{10}$alkyl) unsubstituted or substituted by one or more $C_1$-$C_{20}$alkyl;
a bicyclic or tricyclic hydrocarbon radical with 5 to 20 carbon atoms unsubstituted or substituted by one or more $C_1$-$C_{20}$alkyl;
phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;
phenyl-($C_1$-$C_{10}$alkyl) unsubstituted or substituted by one or more radicals selected from $C_1$-$C_{20}$alkyl, $C_3$-$C_{12}$cycloalkyl, phenyl, $C_1$-$C_{20}$alkoxy and hydroxy;
biphenyl-($C_1$-$C_{10}$alkyl) unsubstituted or substituted by one or more $C_1$-$C_{20}$alkyl;
naphthyl-($C_1$-$C_{10}$alkyl) unsubstituted or substituted by one or more $C_1$-$C_{20}$alkyl; or
tri($C_1$-$C_{10}$alkyl)silyl($C_1$-$C_{10}$alkyl).

* * * * *